United States Patent [19]

Ghajar

[11] 3,821,716

[45] June 28, 1974

[54] METHOD AND APPARATUS FOR RECOVERING DATA IN AN NRZI RECORDING SYSTEM

[75] Inventor: Parviz Ghajar, Norman, Okla.

[73] Assignee: Honeywell Information Systems Inc., Waltham, Mass.

[22] Filed: Mar. 5, 1973

[21] Appl. No.: 334,530

[52] U.S. Cl. .............................. 340/172.5, 360/40

[51] Int. Cl. .............................. G06f 11/00

[58] Field of Search ............ 340/146.1 AB, 146.1 F, 340/174.1 B, 172.5

[56] References Cited

UNITED STATES PATENTS

| | | | |
|---|---|---|---|
| 2,876,352 | 3/1959 | Schneider | 340/172.5 |
| 2,951,229 | 8/1960 | Goldstein | 340/172.5 |
| 3,671,935 | 6/1972 | Lipp et al. | 340/146.1 AB |

*Primary Examiner*—Harvey E. Springborn
*Attorney, Agent, or Firm*—Dudley T. Ready; Gerald R. Woods

[57] ABSTRACT

Apparatus for detecting missing pulses in recovered NRZI encoded data. Positive and negative read signals are separated and applied to different error detecting circuits. Each error detecting circuit has a three stage, serial-transfer, shift register. The second stage output is connected to one circuit output terminal. The first and third stage outputs are applied to a conventional AND gate. The AND gate transmits an output pulse to the second circuit output terminal whenever the first and third stages contain logical "1"s since the NRZI code dictates that an intermediate pulse of the opposite polarity must be missing. The circuit output terminals from both error detecting circuits are connected to the input of an OR gate.

2 Claims, 5 Drawing Figures

METHOD AND APPARATUS FOR RECOVERING DATA IN AN NRZI RECORDING SYSTEM

FIELD OF THE INVENTION

This invention relates to data storage and retrieval systems such as digital computer disk memory systems and analogous systems which transmit and receive data in the form of NRZI (non-return-to-zero) binary signals. It is concerned with recovering drop-out bits, i.e., information lost due to signals failing to cross a given threshold level.

DESCRIPTION OF THE PRIOR ART

A common method of recording data on magnetic disks and tapes is NRZI encoding and decoding. In NRZI recording, an electro-magnetic transducer produces a pattern along a track in the magnetic media wherein a series of "1"s and "0"s is encoded by the rule that whenever a "1" is received, the polarity of current applied to the electromagnetic transducer is reversed to create a magnetic flux reversal in the media. The polarity of current is not changed when "0"s are received. When the data is read out, a signal having a waveform of the type shown in FIG. 1 is generated. A threshold signal level is presumed, in order to reject the noise inherent in the system. When the generated signal for a "1" fails to exceed the threshold, it is interpreted as a "0" and a bit "drop-out" is said to have occurred, which is an error condition. Lowering the threshold level is not a practical way to eliminate drop-outs because the noise peaks will then cause spurious "1"s to be substituted for "0"s. It is common for the noise level to be about 30 percent of the nominal "1" bit signal peaks, after signal has been conditioned.

For a given recording system, drop-outs can be reduced by lowering the recording density or other methods which enhance the signal-to-noise ratio. However, such methods reduce overall memory performance. Furthermore, it should be understood that the usual goal in designing disk and tape systems is not the attainment of completely error free operation. A certain level of errors is acceptable because errors are generally detected by the use of error detecting codes and corrected by retry or some other method. Accordingly, the goal is usually one of keeping the error rate within a rate acceptable to the computer system as a whole. Therefore, the normal result of developing improved apparatus and materials for disks and tapes is to increase recording density and/or some other performance or cost characteristic. For the foreseeable future, there will be a continuing need for improved cost/performance characteristics in memory systems and the minimization of sources of errors will be a central factor in obtaining such improvements.

Although drop-out correction has been attempted for magnetic tapes, "the general difficulties in developing circuits for comparing amplitudes of successive pulses and the sensitivity of the amplitudes to noise have apparently caused a disappearance of interest," R. K. Richards, "Electronic Digital Components and Circuits" (1967), pages 284 and 285.

Accordingly, an object of the invention is to provide practical drop-out correction apparatus for NRZI encoded data having a high noise level environment.

A further object of the invention is to devise a method of processing NRZI encoded data which corrects drop-outs without relying on the relative pulse amplitudes.

SUMMARY OF THE INVENTION

To fulfill the stated objects, an error detecting and correcting apparatus is provided which includes pulse generating means. The pulse generating means receives the analog read signals and produces first and second streams of pulses. The first stream represents positive read signals and the second represents negative read signals. The invention also includes thresholding means which passes only those pulses in each stream which have an amplitude exceeding a certain threshold amplitude. The error detection and correction is performed in first and second error detecting circuits which receive the first and second pulse streams, respectively. Each error detecting circuit includes means for storing successive triplets of signals in one of the pulse streams. Each error detecting circuit further includes means for logically ANDing the first and the third signals in each of the successive triplets. The logical result of the ANDing operation provides one input to an OR circuit. The second signal concurrently stored with the first and third signals provides another input to the OR gate. The same OR gate is connected to both the first and the second error detecting circuits.

BRIEF DESCRIPTION OF THE DRAWINGS

The present invention may be more readily described by reference to the accompanying drawing in which.

DESCRIPTION OF THE PREFERRED EMBODIMENT

Figure 2B:
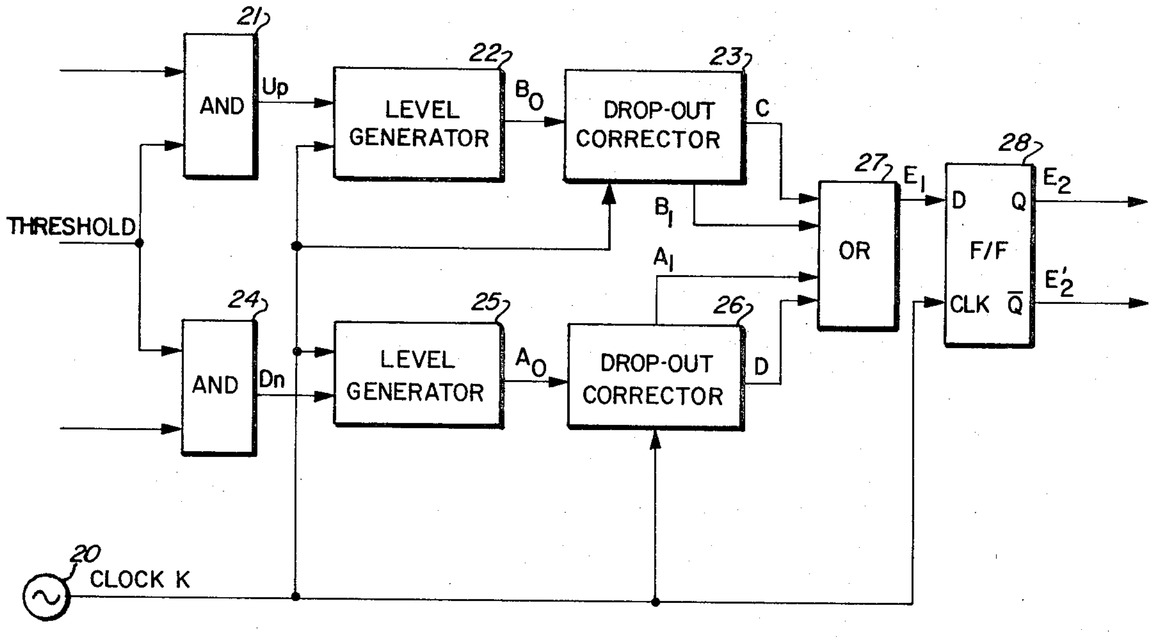
FIGS. 2A and 2B provide a block diagram illustrating the organization of the invention.
Figure 1:
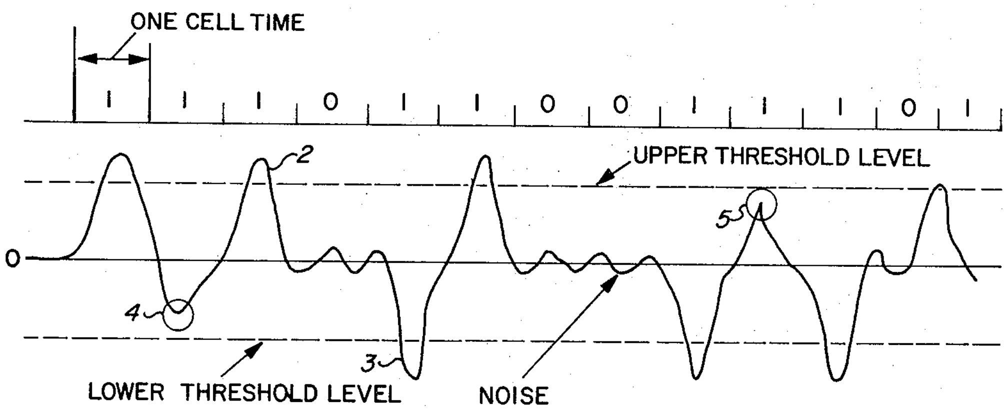
FIG. 1 is a waveform diagram illustrating an NRZI analog signal having drop-outs.
Figure 2A:
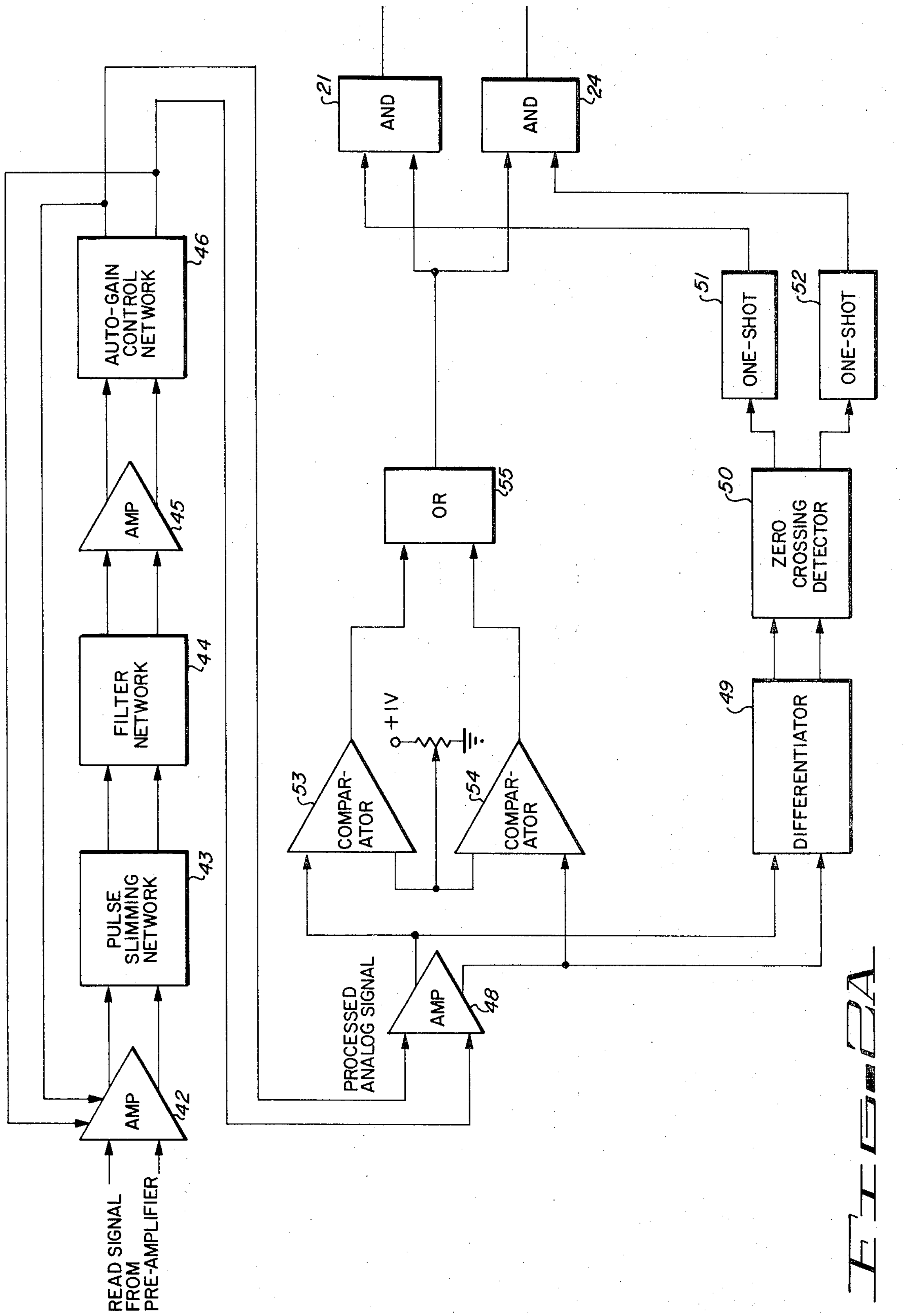
Figure 4:
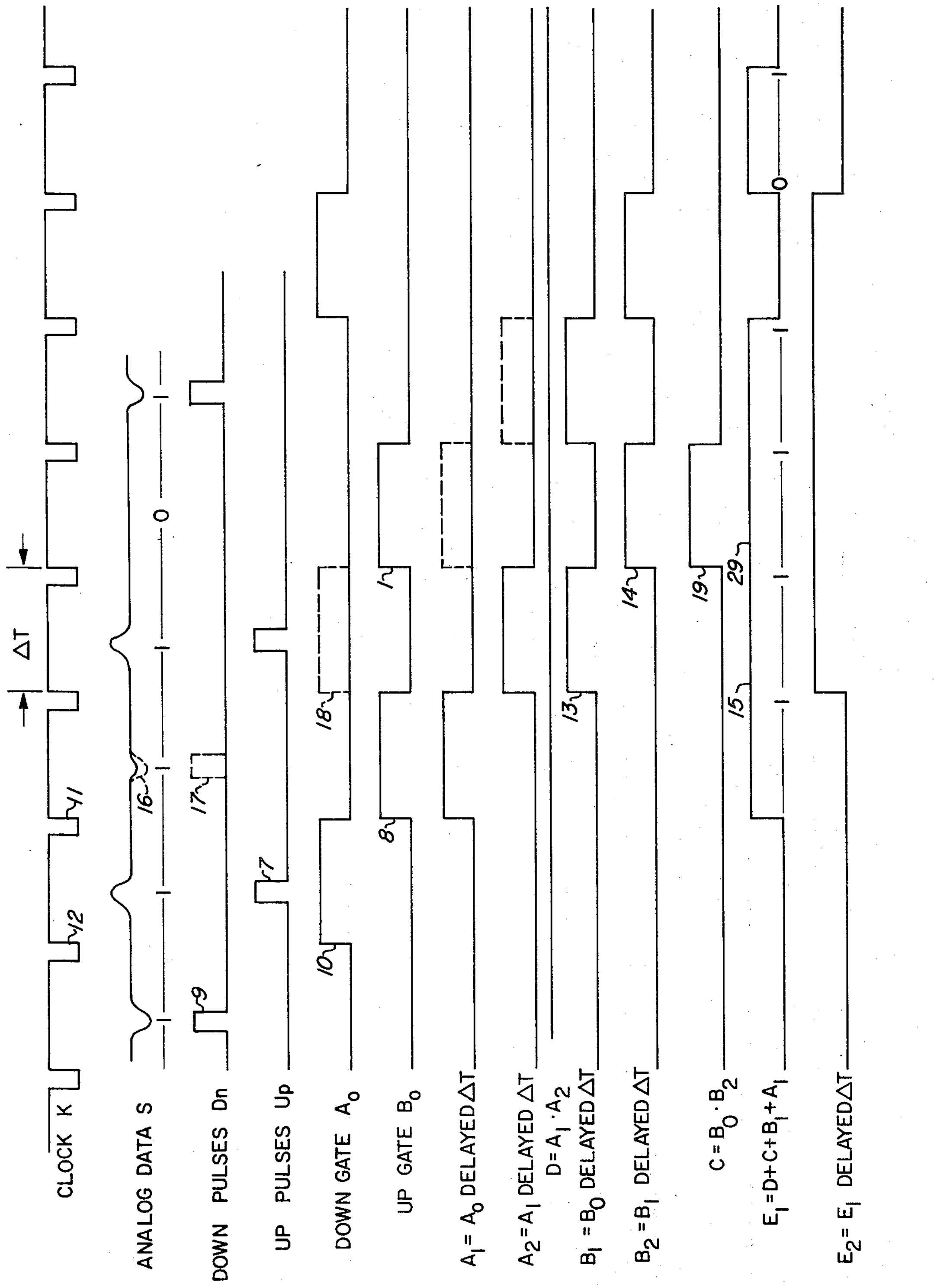
FIG. 4 is a set of waveforms illustrating operation of the invention.

For a more complete understanding of the invention, reference is made to the block diagram of FIGS. 2A and 2B and the accompanying timing and waveform diagrams of FIGS. 1 and 4. A representative waveform of a signal induced in a transducer by a magnetic disk surface which represents a sequence of binary signals 1110110011101 is shown in FIG. 1. The "1" bits are represented by positive-going peaks such as 2 or negative-going peaks such as 3 which exceed in magnitude the upper and lower threshold levels, respectively. The "0" bits are represented by the absence of such peaks during a given cell time. Also shown in FIG. 1 are two signal peaks 4 and 5 having amplitudes less than the threshold levels. When processed, erroneous "0" bits result which are called drop-outs. It will be noted that successive "1"s are of opposite polarity and that the drop-outs shown occur in the center of a cluster of three consecutive "1" bits. The reduced drop-out amplitude is considered to be caused by a crowding effect due to the immediate neighboring transitions which result in insufficient magnetization time because the rapid change in magnetic flux exceeds the response capability of the transducer head and the recording media.

Figure 3:
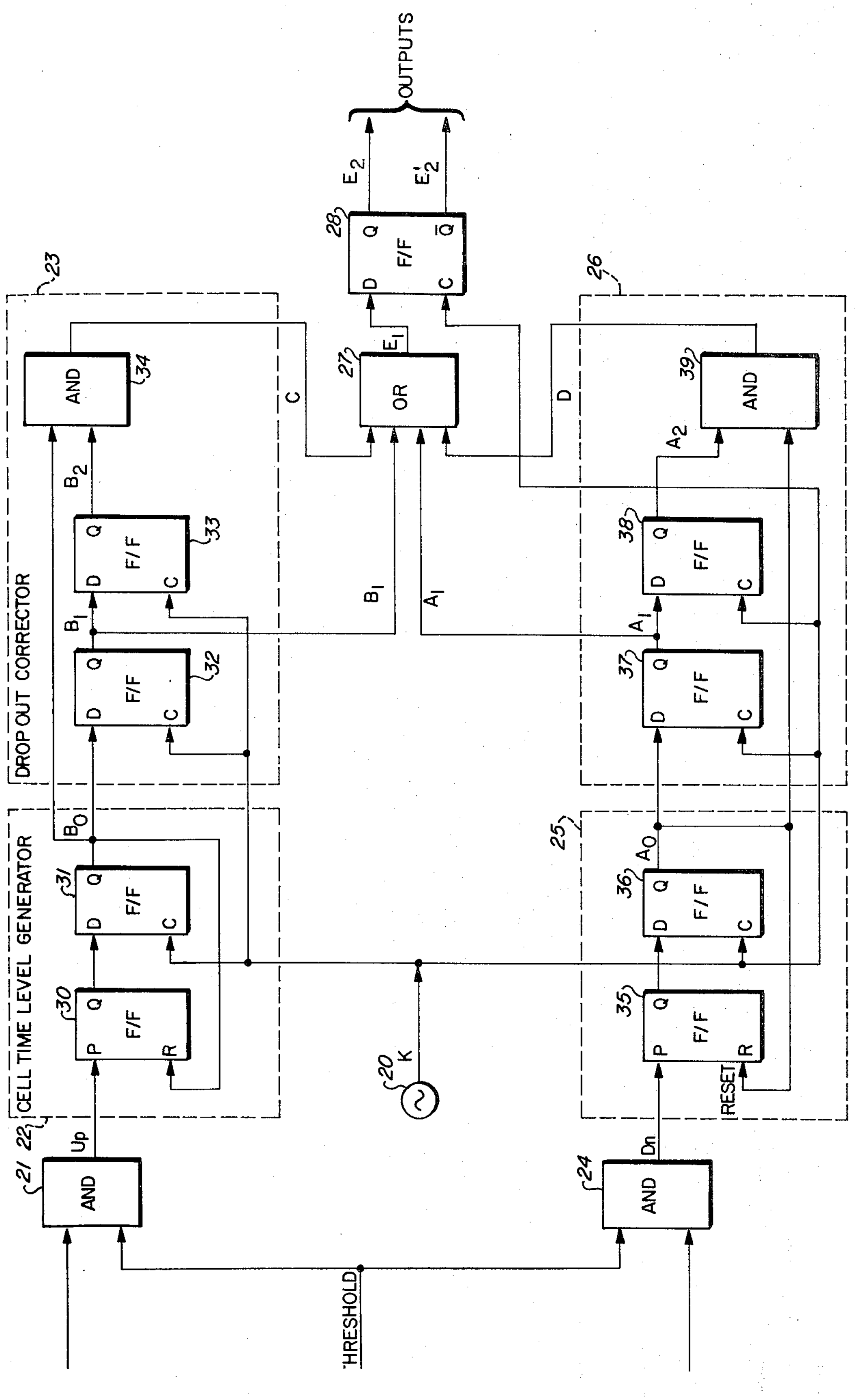
FIG. 3 is a logic diagram of an implementation of the invention.

The logic elements illustrated in FIGS. 2A, 2B and 3 are of a conventional nature. That is, an AND-gate is a multiple imput logic element which provides at its output a binary signal level selected for a logical "1"

value if and only if all of its input signals have a "1" value. An OR-gate is a multiple input logic element which provides at its output a "1" level signal if one or more of its input signals is a "1." The term Set-Reset flip-flop, as used in the present description, designates a bistable multivibrator with its two stable states being a set state in which there is a "1" signal at its Q output terminal when a "1" is applied to its set or P input terminal and being a reset state in which there is a "0" signal at its Q output terminal when a "1" is applied to its reset or R input terminal. Flip-flop 30 in FIG. 3 is a set-reset flip-flop. A delay, latch or D-type flip-flop designates a bistable multivibrator with its two stable states being a set state in which there is a "1" signal at its Q output terminal if a "1" is applied to its D-input terminal when the C-terminal is clocked and being a reset state in which there is a "0" signal at its D-output if a "0" is applied to its Q input when the C-terminal is clocked. Flip-flop 36 in FIG. 3 is an example of this type of circuit.

In FIG. 2A, the analog signals generated by a transducer associated with a magnetic recording surface are preferably subjected to conventional initial processing. After preamplification, the read signal from the transducer is amplified by amplifier 42, passed through pulse slimming and band pass filter networks 43 and 44, amplified again by amplifier 45, and passed through AGC network 46, which has its output fed back to amplifier 42. As is normally the case, for such signal processing, the output from the AGC network 46 typically ranges from 100 to 800 millivolts peak-to-peak. Because an AGC network does not respond to sudden changes in signal magnitude, the low level signal peaks leading to drop-outs are not corrected in general. The outputs of AGC network 46 are of equal amplitude and opposite polarity. These signals are subjected to further conventional read signal processing by being amplified in amplifier 48 and then passed through differentiator 49 and zero-crossing detector 50. The outputs of amplifier 48 have peak amplitudes of approximately 0.7 volts and have a waveform such as shown in FIG. 1. One-shot multivibrators 51 and 52 digitize the outputs of zero-crossing detector 50 into down pulses and up pulses. The method of initially processing signals is not a part of the invention and any proved method may be employed. In order to reject spurious pulses produced by noise peaks in the zero-crossing detector, threshold gating is necessary. Accordingly, the outputs of amplifier 48 are also applied to respective comparators 53 and 54, each of which has its other input connected to a preselected dc voltage that establishes the threshold level, typically 0.3 volts. The comparators therefore produce threshold gating pulses which have a duration commensurate with the time the input waveform peaks exceed the selected threshold level for respective polarity peaks. The threshold gating pulses are combined by OR-gate 55 and applied to the AND-gates 21 and 24 in the drop-out corrector of FIG. 2B. The threshold gating pulses enable the suppression of noise, but the drop-out pulses are suppressed at the same time. The output Up, of AND-gate 21 rises to logical one whenever the corresponding analog diata data exceeds the threshold level as shown by pulse 7 in FIG. 5. Cell time level generator 23, in response to the short pulses from AND-gate 21, produces and stores pulses $B_0$ synchronized with the system cell clock K and having a duration equal to the clock cycle time, typically 200 ns. Drop-out corrector 23, in response to the $B_0$ pulses and cell clock K, stores pulses for two cell times and generates a correction pulse C whenever there are two positive-going pulses separated by a cell time. An OR-gate 27, in response to one cell time delayed pulses $B_1$ and correction pulses C from drop-out corrector 23, combines them in an inclusive-OR fashion to produce pulses $E_1$. D-type flip-flop 28 repeats and delays the $E_1$ pulses, generating pulses $E_2$ and the complement $E'_2$, which are delayed one cell time. AND-gate 24, cell time level generator 25 and drop-out corrector 26 operate in the same manner as AND-gate 21, cell time level generator 22 and drop-out corrector 23, respectively, except that AND-gate 21 output pulses Dn are applied to cell time level generator 25 for negative-going analog data signals.

The implementation of the correction apparatus is shown in greater detail in FIG. 3. Cell time level generator 22 consists of set-reset flip-flop 30 and a D-type flip-flop 31. Whenever AND-gate 21 applies a pulse such as 7 (FIG. 4) to flip-flop 30, the latter is set which in turn causes the flip-flop 31 to be set when the latter is clocked by the next cell time pulse of the clock K. The output $B_0$ of flip-flop 31, in addition to providing the input to the drop-out corrector 23, also serves to reset flip-flop 30, thereby enabling it for receiving subsequent pulses Up. The drop-out corrector 23 consists of two serially connected D-type flip-flops 32 and 33 and AND-gate 34. Flip-flop 32 produces pulses $B_1$, delayed one cell time $\Delta T$ relative to its input $B_0$, and flip-flop 33 produces pulses $B_2$ delayed one cell time $\Delta T$ relative to its input $B_1$. Flip-flops 31-33, in effect, constitute a three stage shift register. AND-gate 34 generates the correction signal $C = B_0 \cdot B_2$ in accordance with the outputs of flip-flops 31 and 33. The flip-flops are clocked by the cell time pulses of clock K, provided by a variable frequency oscillator 20 which is synchronized with the analog data signals being read.

The operation of the correction apparatus is as follows. When either an Up or Dn pulse 7 or 9 (FIG. 4) is generated by AND-gates 21 and 24, one of the respective flip-flops 30 or 35 is set and with the next cell time pulse 11 or 12, flip-flop 31 or 36 generates a synchronized $B_0$ or $A_0$ pulse 8 or 10. It should be noted that a particular Up and Dn pulse need not be synchronized because operation of the cell time level generators 22 and 25 permits these pulses to occur any time between cell clock pulses. The occurrence of a positive-going "1" pulse such as 8 results in pulses 13 in $B_1$ and 14 in $B_2$ delayed one pulse time $\Delta T$ and two pulse times $2\Delta T$ from flip-flops 32 and 33, respectively. Flip-flops 37 and 38 generate the delayed pulses $A_1$ and $A_2$ in the same manner. The corrector output $E_2$ is taken from flip-flop 32 ($B_1$) and 37 ($A_1$) which are combined by OR-gate 27. This gate also combines the correction pulses C and D from AND-gates 34 and 39. In the analog data signal S, a pulse 16 is shown in a dashed line of proper amplitude for a "1" bit where a drop-out occurred. As a result, the proper pulse 17 from AND-gate 24 and $A_0$ pulse 18, shown in dashed lines, are missing. However, because of the $B_0$ "1" pulse 1 from flip-flop 31 and the $B_2$ "1" pulse 14 from flip-flop 33, the AND-gate output C provides a "1" bit 19 for correcting the drop-out. Accordingly, the output $E_1$ of OR-gate 27 remains a "1" at 29, which produces the corrector output $E_2$ delayed by one cell time $\Delta T$ relative to $E_1$.

It is understood that the invention should not be construed as being limited to the form of embodiment described and shown herein as many modifications may be made by those skilled in the art without departing from the scope of the invention. For example, although the apparatus has been described as operating on NRZI pulses which represent "1"s, the pulses could represent "0"s (and the absence of a pulse during a cell time representing a "1").

What is claimed is:

1. An error detecting and correcting apparatus for use in recovering NRZI encoded data from a data storage device comprising:

a. pulse generating means for receiving an analog read signal and for producing a first stream of pulses representing positive read signals and a second stream of pulses representing negative read signals;

b. thresholding means connected to said pulse generating means and the analog read signal source for passing only pulses having an amplitude exceeding a predetermined threshold amplitude;

c. a first error detecting circuit for receiving the first pulse stream and a second error detecting circuit for receiving the second pulse stream, each of said error detecting circuits including:

1. means for storing successive triplets of signals received from said thresholding means, and
2. means for logically ANDing the first and third stored signals; and d. means for logically ORing the output of said AND means in both of said error detecting circuits with the second stored signal in both of said error detecting circuits.

2. An error detecting and correcting apparatus for use in recovering NRZI encoded data read from a data storage device comprising:

a. pulse generating means for receiving an analog read signal and for producing a first stream of pulses representing positive read signals and a separate second stream of pulses representing negative read signals;

b. thresholding means connected to said pulse generating means and the analog read signal source for passing only pulses which have an amplitude exceeding a predetermined threshold amplitude;

c. a first error detecting circuit for receiving the first pulse stream and a second error detecting circuit for receiving the second pulse stream, each of said error detecting circuits including:

1. a three stage serial transfer shift register in which the first stage input receives the pulse stream,
2. clocking means for serially shifting the pulse stream through said register with a frequency corresponding to the analog signal read frequency, and
3. an AND gate having inputs connected to the outputs of the first and third stages of said register to generate an error correction output signal when pulses are concurrently stored in those stages; and d. an OR gate having inputs from the output side of the AND gate and output side of the second stage of said register in both of said first and second error detecting circuits.

* * * * *